United States Patent [19]

Ward et al.

[11] Patent Number: 4,480,791
[45] Date of Patent: Nov. 6, 1984

[54] SPRAYER APPARATUS

[76] Inventors: Jarrel D. Ward, P.O. Box 272, Rodessa, La. 71069; Richard E. Turner, deceased, late of Palo Pinto, Tex.; by Betty L. Turner, heiress, 1403 Southeast 20th St., Mineral Wells, Tex. 76067; by Christina G. Blais, heiress, 1407 Woodbine Ct., Arlington, Tex. 76012; by Terry L. Turner, heiress, 7606 Currin, Dallas, Tex. 75230; by Jane E. Shurley, heiress, 1003 Eagle Dr. #125, Denton, Tex. 76201

[21] Appl. No.: 392,008

[22] Filed: Jun. 25, 1982

[51] Int. Cl.³ .............................................. B05B 1/30
[52] U.S. Cl. ........................... 239/533.15; 239/553.5; 239/562
[58] Field of Search ................ 239/533.1, 533.15, 553, 239/553.5, 562, 569, 570, 581, 582, 600

[56] References Cited

U.S. PATENT DOCUMENTS

| | | | |
|---|---|---|---|
| 571,431 | 11/1896 | Detwiler | 239/553 |
| 859,701 | 7/1907 | Speakman | 239/562 |
| 2,633,386 | 3/1953 | Mahoney | 239/570 |

Primary Examiner—Andres Kashnikow
Attorney, Agent, or Firm—Gerald G. Crutsinger; John F. Booth; Monty L. Ross

[57] ABSTRACT

A fluid sprayer apparatus attachable to an aircraft comprising a center section nozzle tube, a pair of detachable extension nozzle tubes connected to said center nozzle tube by quick disconnect fixtures, a manifold tube for supplying spray fluid to said nozzle tubes, said spray nozzle tubes having a plurality of inlet fittings spaced along their lengths and a plurality of pressure operated spray nozzles each removably attached to one of said fittings, said nozzles comprising a body member, a plunger slidably received in said body member with a pressure piston extending into said fitting, said plunger carrying a seal member engagable with the outlet end of said fitting to close said nozzle to fluid flow and a control insert unyieldably holding said seal member in sealing engagement with said inlet fitting when in a first position and yieldably holding said seal member in sealing engagement with said inlet fitting when in a second position whereby said nozzle may be opened to fluid flow by fluid pressure against said piston.

7 Claims, 4 Drawing Figures

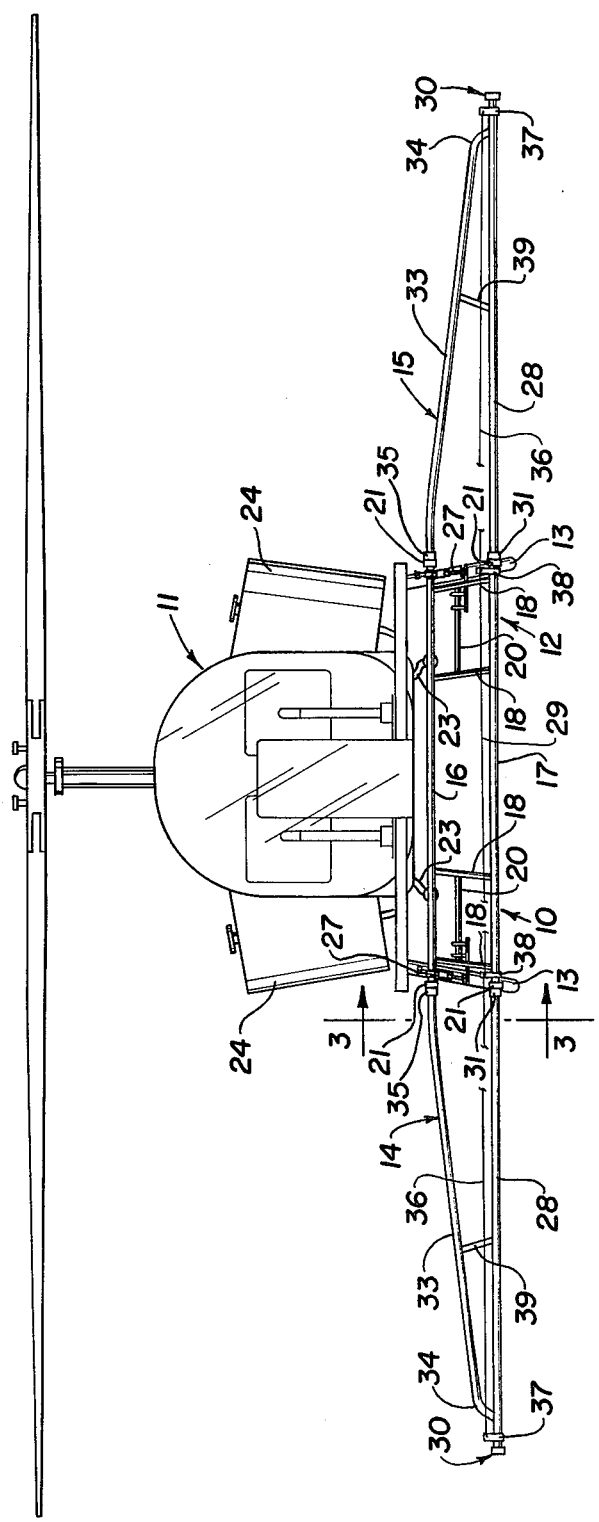
Fig. I

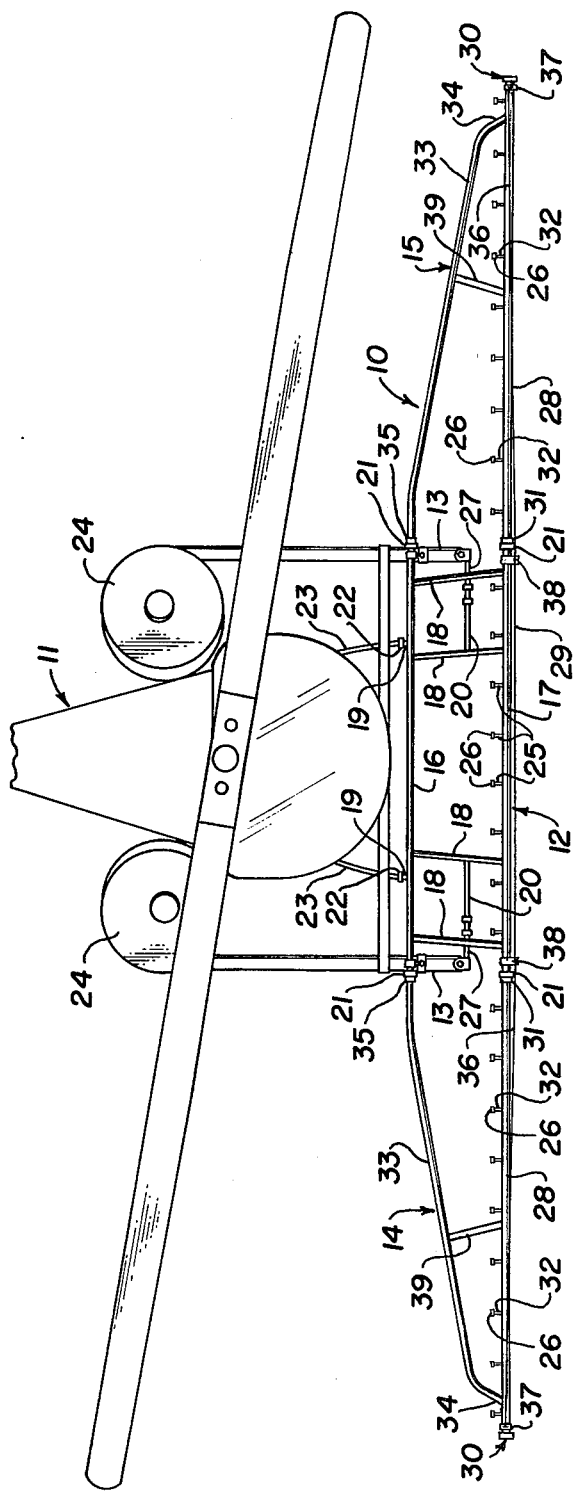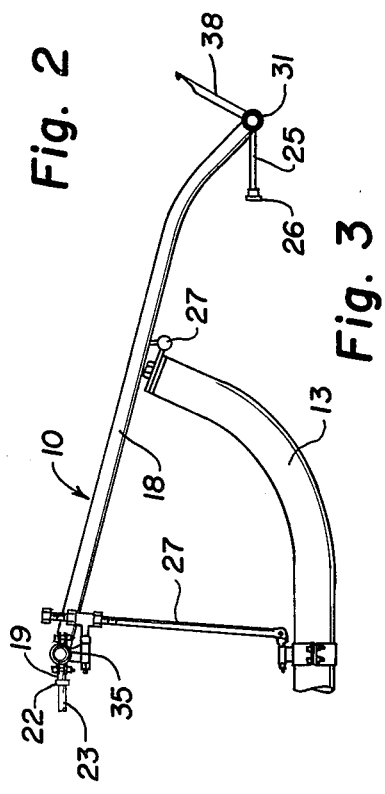

SPRAYER APPARATUS

BACKGROUND OF THE INVENTION

This invention relates to chemical sprayer apparatus and particularly to a boom and nozzle fluid sprayer of the type commonly used in applying chemicals to farm crops and other vegetation from aircraft.

In aerial application of herbicides and other chemicals, it is essential to have a system providing positive and complete control over the pattern and rate of application of the chemical. Thus, the spray apparatus must provide accurate, adjustable control of the sprayer pattern width and the chemical release rate. The sprayer apparatus must also provide positive shutoff to prevent over running of the area to be sprayed and/or dripping of the spray chemical in areas where it is unwanted. Further, in order for the chemical particles to settle to the ground in a predictable manner after release, the droplets must be of uniform size.

Because spraying operations are dictated by weather conditions, it is important that the sprayer apparatus be as free as possible from breakdowns. Repairs, adjustments and replacement of parts, when necessary, should be accomplished as simply and quickly as possible.

Accordingly, it is an object of the present invention to provide sprayer apparatus producing uniform and even application of a spray chemical.

It is a further object to provide sprayer apparatus wherein the width of spray pattern is easily adjustable.

It is a still further object to provide sprayer apparatus wherein the rate of chemical application is easily adjustable.

It is an additional object to provide a sprayer apparatus having a positive spray cutoff to prevent drip or leakage of spray chemical in unwanted areas.

BRIEF DESCRIPTION OF THE DRAWINGS

These and other objects and advantages of the present invention will become apparent from the following detailed description of the preferred embodiment when read with reference to the accompanying drawings wherein:

FIG. 1 is a front view of a sprayer helicopter with the apparatus of the present invention installed;

FIG. 2 is a top view of the helicopter and sprayer apparatus of FIG. 1;

FIG. 3 is a section taken along lines 3—3 of FIG. 1 showing additional details of the sprayer apparatus of the present invention.

DETAILED DESCRIPTION

Figure 4:
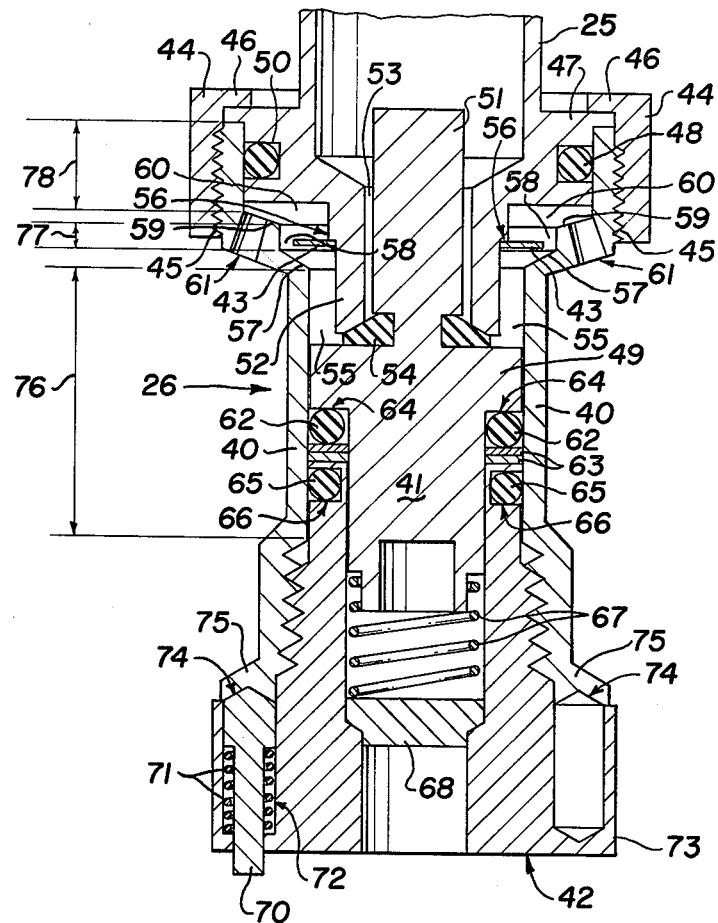
FIG. 4 is a view in section of the novel spray nozzle of the present invention.

Referring now to FIGS. 1-3, the sprayer apparatus 10 of the present invention is shown installed on a helicopter 11 designed for agricultural chemical spraying operations. The sprayer apparatus 10 can as well be used with fixed wing aircraft. The apparatus 10 comprises a center section 12 mounted between the landing skids 13 of the aircraft. Optional sprayer boom extensions 14 and 15 are provided with quick installation and removal features so that the width of the spray pattern produced may be modified in a matter of minutes.

The center section 12 includes a manifold tube 16 with connections to the nozzle tube 17 through feeder tubes 18. Braces 20 are connected between the feeder tubes 18 on each side. "Quick disconnect" female fixtures 21 close each end of the manifold 16 and nozzle tube 17. A pair of input ports 19 with quick disconnect male fixtures 22 receive an input of spray chemical to the manifold 16 through supply hoses 23 connected through control valves (not shown) to chemical supply tanks 24 mounted on the aircraft 11.

Spaced along the nozzle boom tube 17 are a plurality of nozzle inlet fittings 25 to each of which is removably attached a pressure operable spray nozzle 26. The various parts and pieces of the sprayer apparatus are of a corrosive resistant material such as, for example, stainless steel and, with the exception of spray nozzle 26 are preferably permanently joined together as by welding.

The sprayer apparatus section 12 is supported on the landing skids 13 of the aircraft 11 by appropriate mounting fixtures 27.

Each of the optional sprayer boom extensions 14 and 15 comprise a nozzle tube extension 28 closed at its outer end 30 and terminating at its other end in a "quick disconnect" male fixture 31. A plurality of nozzle inlet fittings 32 like fittings 25 are affixed along the nozzle tube extension 28 at intervals the same as those for fittings 25. Pressure operable spray nozzles 26 are also removably attached to each inlet fitting 32. A feeder tube extension 33 connects to nozzle tube extension 28 at its outer end 34 and through branch feeder 39 to an intermediate point of tube 28. The "inboard end" of feeder tube extension 33 has a "quick disconnect" male fixture 35. Fixtures 31 and 35 mate with fixtures 21, thus providing fluid flow of the chemical to be sprayed to the boom extensions 14 and 15 through manifold tube 16 as well as through nozzle tube 17.

The boom extensions 14 and 15 are supported by the mating connection of fixtures 21 and 31 and 35. Additional support is supplied by cable 36 connected between cable brackets 37 and 38. Additional support of the sprayer apparatus center is supplied by cables 29 connected between the cable brackets 38.

The unique structure and design of spray nozzles 26 is a major factor contributing to the advantages of the sprayer apparatus of this invention. A nozzle 26 is shown in section in FIG. 4. The principal parts include a body member 40, a plunger 41, control insert 42 and fluid dispersal ring 43.

Body member 40 comprises sections having three different bore diameters, section 76 having a smaller diameter bore, section 77 having an intermediate diameter bore and section 78 having a larger diameter bore. The bore diameter of section 78 is matched to the outside diameter of attachment collar 47. The nozzle is removably attached to the fitting 25 by placing section 78 of the nozzle over attachment collar and engaging the external threads 45 of section 78 with the threads of retaining nut 44. Flange 46 of retaining nut 44 bears against the top surface of collar 47. An "O" ring 48 in groove 50 of fitting collar 47 provides a fluid-tight seal between inlet fitting 25 and the body member 40.

The plunger 41 comprises a base 49 and a piston 51 with a seal member 54 carried therebetween. The piston 51 of plunger 41 is received into the bore of the necked down section 52 of fitting 25 to define a calibration passage 53 for accurate metering of the fluid flow. Seal member 54 of neoprene or other appropriate resilient material is carried by plunger 41. Seal member 54 seats against the tapered end wall of section 52 of fitting 25 to close the nozzle to fluid flow. An equal pressure and volume chamber 55 is defined by the outer wall of fitting 25 section 52 and the inner wall of section 76 of the body member 40. Fluid dispersal ring 43 rests against the shoulder 56 on section 52. Ring 43 in conjunction with the tapered wall 57 and the wall of section 77 of body member 40 defines an equal dispersal passage 58 into an outlet chamber 60. A number of output orifices 61 are spaced around the tapered wall 59 of body member 40 for exit of the spray fluid.

The base 49 of plunger 41 has an outside diameter on at least a portion thereof matched to the bore diameter of section 76 of body member 40 for slidable movement of the plunger 41 within the body member 40.

Plunger 41 is retained in body member 40 by control insert 42 threadedly connected into the lower part of the body member 40. Fluid seals between the insert 42, body 40 and plunger 41 are provided by "O" ring 62 and washers 63 bearing against the underside of shoulder 64 of plunger 41 and the end surface of insert 42, respectively, and by "O" ring 65 within slot 66 of the insert.

A spring 67 seated against a plug 68 bears against the underside of plunger 41 urging it upward. A lock bar 70 and spring 71 are housed in a bore 72 in the knob portion 73 of the control insert 42. Spring 71 urges bar 70 to seat in one of a plurality of detents 74 spaced around the lower flange 75 of valve body 40 to prevent unintentional or accidental turning and in and out movement of the control insert 42.

As shown in FIG. 4, the nozzle 26 is in the "off" condition having been completely closed to fluid flow by manual rotation of the control insert 42 forcing the seal 54 tightly and unyieldably against the tapered end wall of fitting 25. To set the nozzle to the "on" condition ready for spraying, the knob 73 is turned to back the control insert 42 out of the body member 40 a short distance. The nozzle is then held closed to fluid flow only by the force of spring 67 acting against plunger 41 to maintain seal member 54 against the end of fitting 25. However, this force is yieldable and the nozzle will be opened to fluid flow when spray fluid is supplied through the fitting 25 at sufficient pressure to produce a force on piston 51 large enough to overcome the force of spring 67. This force on piston 51 causes the plunger 41 with seal member 54 to move, thus opening the passage between seal 54 and fitting 25 end wall to fluid flow.

In operating the sprayer apparatus of the present invention, the pilot brings his aircraft into position for a spray "pass" and, by controls in his cockpit, admits the spray chemical under pressure to the manifold tube 16. The pressure delivery of the spray chemical from the tanks 24 is achieved conventionally as by pumps and preferably is at a pressure of about 35 pounds per square inch. At this supply pressure, sufficient fluid force is exerted against pistons 51 to overcome springs 67 and move plungers 41 thus opening all nozzles which are not in the "off" condition. At the end of the "pass" the pilot shuts off the pressurized spray chemical supply. Springs 67 immediately close the nozzles by seating seals 54. The lower external air pressure produced by the flight wind past the nozzles immediately purges the nozzle chambers of the spray chemical. Since the nozzle chamber inlets are positively sealed against spray chemical input, all dripping and leakage common in many prior art systems is eliminated.

When nozzles 26 are open and spraying under the supply pressure, the spray chemical is metered through the calibration passage 53 at an accurate known rate depending on the design dimensions of piston 51 and inside diameter of section 52. The spray chemical in passing from the equal pressure and volume chamber 55 into outlet chamber 60 is dispersed evenly in the passage defined by the dispersal ring 43. The spray chemical exits through orifices 61 at a minimum pressure (for example from one to two psi) to assure a smooth even spray of uniform droplet size with the elimination of fines and mist. Elimination of fines and mist is important to prevent uncontrollable drift of the chemical out of the intended target area.

In many prior art sprayer systems changing or adjusting the width of the spray path or rate of spray application may have required up to four to five hours time and often involved complicated boom assembly or disassembly processes. With the spray apparatus of the present invention gross adjustments of the spray path width are easily made by simple addition or removal of the boom extensions. The quick disconnect fixtures allow such changes within the time of a routine fueling stop. Still quicker adjustments of spray path width can be made by the manual on-off control setting of an appropriate number of the outboard nozzles. Further, the rate of spray application can be quickly adjusted by manual setting of the on-off controls of an appropriate number of nozzles at equal spacings along the booms. For example, for one-half the maximum spray rate every other nozzle is manually shutoff; for two-thirds the maximum rate, every third nozzle is shutoff.

A convenient size for the sprayer apparatus of the present invention has been found to be approximately 24 feet in total length; a center section length of eight feet and two eight foot extensions sections. The apparatus weighs slightly over 60 pounds. Such size lends itself to easy loading and unloading and trailering with helicopter aircraft of the customary type. The swath width can be adjusted from three feet to 45 feet and the total spray rate can be varied from five gallons per acre to 30 gallons per acre with the apparatus described. The time required for calibration or adjustment to any combination of swath width and application rate is ordinarily no longer than five minutes. The appropriate boom pressure has been found to be 35 pounds per square inch with a nozzle outlet pressure being approximately one quarter pound per square inch.

Because of the relatively simple structures and mechanical design of the spray nozzles, and their attachment mechanism, removal, replacement, disassembly, assembly and repair or unclogging of the spray nozzles of the present invention may be accomplished with unusual quickness and ease.

Thus there has been disclosed a new and advantageous spray apparatus especially useful in the aerial application of chemicals for agricultural purposes. Many changes and modifications still within the spirit and scope of the teachings herein may occur to those skilled in the art and, therefore, it is intended that this invention be limited only as set forth in the following claims.

Having disclosed the invention, what is claimed is:

1. A spray nozzle unit adapted for removable attachment to a tubular inlet fitting having a peripheral attachment collar placed above the outlet end of the fitting, said nozzle unit comprising a body member, a plunger, a control insert and a fluid dispersal ring, said body member being tubular and having a first section of intermediate bore diameter, a second section of smaller bore diameter, a third section of larger bore diameter, tapered wall portions between said sections and a plurality of outlet orifices spaced around the tapered wall portion adjacent said third section, the bore diameter of said second section being larger than the outside diameter of said fitting below said attachment collar, said plunger having a piston and a base with a seal member carried therebetween, said piston adapted to extend into the outlet end of said fitting to define with the internal walls thereof a metering passage, said base having at least a portion thereof of a diameter matching the bore diameter of said second section of said body member for slidable relative motion between said plunger and said body member to bring said seal member into and out of sealing engagement with the outlet end of said inlet fitting, said control insert having means holding said plunger seal member in unyieldable sealing engagement with said inlet fitting when in a first position and means yieldably urging said seal member into sealing engagement with the end of said inlet fitting when in a different position, said fluid dispersal ring being fitted around said inlet fitting below said collar, whereby the internal walls of said body member, the external walls of said fitting and said fluid dispersal ring define an equal pressure and volume chamber, an outlet chamber and an equal dispersal passage therebetween.

2. The nozzle unit defined in claim 1 further including means holding said control insert in a selected one of said first and second positions.

3. The nozzle unit defined in claim 2 wherein said means holding comprises a spring loaded pin and detent means.

4. The nozzle unit defined in claim 3 wherein said control insert threadedly engages said body member.

5. The nozzle unit defined in any one of claims 1-4 wherein said body member has external threads with which said unit is attached to said fitting through the engagement of said threads with the threads of a flanged retaining nut bearing against said fitting collar.

6. The nozzle unit of claim 5 wherein fluid seals are incorporated between said inlet fitting and said body member and between said body member said plunger and said control insert.

7. The nozzle unit of claim 6 wherein said fluid seals are "O" rings.

* * * * *